(12) United States Patent
Haines et al.

(10) Patent No.: US 8,915,263 B2
(45) Date of Patent: Dec. 23, 2014

(54) AEROSOL SUPPLY DEVICE AND PRESSURE REGULATOR APPARATUS USED THEREWITH

(75) Inventors: Paul Mark Haines, Lebanon, OR (US);
Mark A Devries, Albany, OR (US);
Ronald Ender, Corvallis, OR (US);
Craig Malik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 13/259,237

(22) PCT Filed: Sep. 14, 2009

(86) PCT No.: PCT/US2009/056803
§ 371 (c)(1),
(2), (4) Date: Sep. 23, 2011

(87) PCT Pub. No.: WO2011/031269
PCT Pub. Date: Mar. 17, 2011

(65) Prior Publication Data
US 2012/0012195 A1 Jan. 19, 2012

(51) Int. Cl.
*G05D 16/06* (2006.01)
(52) U.S. Cl.
CPC .................... *G05D 16/0619* (2013.01)
USPC ........................ 137/505.25; 137/507; 137/508
(58) Field of Classification Search
USPC ............. 137/225, 507, 508, 509, 510, 505.25
See application file for complete search history.

(56) References Cited

U.S. PATENT DOCUMENTS

| 2,833,304 | A | * | 5/1958 | Fish ............................... 137/495 |
| 2,844,165 | A | * | 7/1958 | Morse ......................... 137/493.6 |
| 3,886,969 | A | * | 6/1975 | Shira et al. .................... 137/509 |
| 4,172,468 | A | * | 10/1979 | Ruus ............................. 137/504 |
| 4,921,004 | A | | 5/1990 | Lane et al. |
| 5,275,202 | A | * | 1/1994 | VanDeVyvere .............. 137/492 |
| 5,875,815 | A | * | 3/1999 | Ungerecht et al. ........ 137/505.25 |
| 6,250,327 | B1 | | 6/2001 | Freigang et al. |
| 7,032,611 | B1 | | 4/2006 | Sheng |

OTHER PUBLICATIONS

Hewlett-Packard Development Company, L.P., PCT International Preliminary Report on Patentability, Application No. PCT/US2009/056803, Report dated Mar. 29, 2012.

* cited by examiner

*Primary Examiner* — William McCalister
(74) *Attorney, Agent, or Firm* — Hewlett-Packard Patent Department; Victor DeVito

(57) ABSTRACT

A pressure regulator apparatus usable with an aerosol supply device containing a fluid includes an inflatable diaphragm unit including an upper surface member, a lower surface member, and a diaphragm chamber formed between the upper surface member and the lower surface member, an output port member having an output cavity and an output port, at least a portion of the output port member is disposed within and in fluid communication with the diaphragm chamber, a valve actuator including an actuator cavity and one or more actuator openings in fluid communication with the output port, at least a portion of the valve actuator is moveably disposed within the output cavity, an input port member having an input port configured to allow the fluid to enter the actuator cavity, at least a portion of the input port member is disposed proximate to the actuator cavity, and an axial flow path extending between the input port and the output port, and configured to allow the fluid to selectively pass in a substantially axial direction therethrough, wherein the valve actuator moves to close and open the input port based on an inflation status of the inflatable diaphragm unit to regulate a pressure of the fluid to be transported from the inflatable diaphragm unit substantially constant.

15 Claims, 3 Drawing Sheets

AEROSOL SUPPLY DEVICE AND PRESSURE REGULATOR APPARATUS USED THEREWITH

BACKGROUND

Figure 1A:
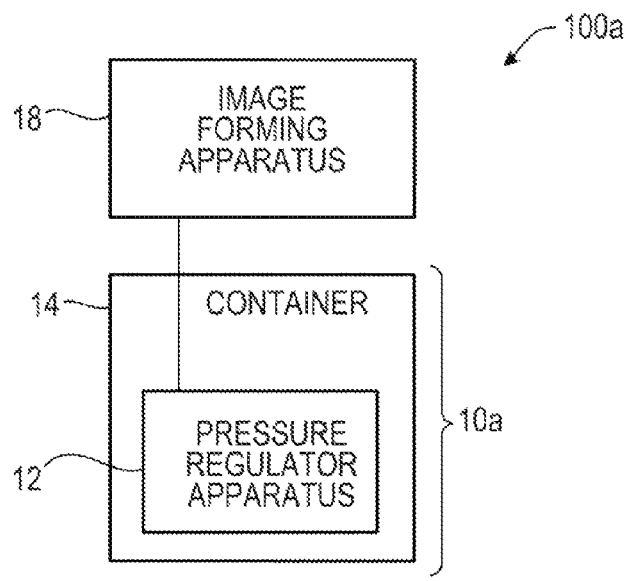

Aerosol supply devices such as aerosol cans typically contain fluid and a propellant to deliver the fluid outside thereof. Typical propellants used are chlorofluorocarbons, hydrocarbons, and compressed gas. A pressure within the aerosol can is determined by the respective propellant used, temperature, and remaining fluid content in the aerosol can. Actual can pressure, however, can vary with changes in content volume and temperature therein. In one application, the fluid can be dispensed from the aerosol can such as spray paint onto an object. In another application, the fluid can be dispensed from the aerosol can to an external device such as an image forming apparatus.

BRIEF DESCRIPTION OF THE DRAWINGS

Exemplary non-limiting embodiments of the present general inventive concept are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

FIGS. 1A and 1B are block diagrams of fluid dispensing systems according to embodiments of the present general inventive concept;

FIGS. 2A and 2B are partial perspective views of a pressure regulator apparatus in a first inflation state and a second inflation state, respectively, according to embodiments of the present general inventive concept;

FIG. 3 is a side view of the valve actuator of the pressure regulator apparatus of FIGS. 2A and 2B according to an embodiment of the present general inventive concept; and FIG. 4 is a partial perspective view of a pressure regulator apparatus according to an embodiment of the present general inventive concept.

DETAILED DESCRIPTION

In the following detailed description, reference is made to the accompanying drawings which form a part hereof, and in which is depicted by way of illustration specific embodiments in which the general inventive concept may be practiced. It is to be understood that other embodiments may be utilized and structural or logical changes may be made without departing from the scope of the present general inventive concept. The following detailed description, therefore, is not to be taken in a limiting sense, and the scope of the present general inventive concept is defined by the appended claims.

Aerosol supply devices, for example, aerosol cans, typically contain fluid and a propellant to deliver the fluid outside thereof. In one application, the aerosol supply device dispenses the fluid, for example, ink, to an external device such as an image forming apparatus. In such a case, a pressure of the fluid provided to the image forming apparatus may be influenced by the respective propellant, temperature and remaining content volume in the aerosol supply device. As the remaining volume content varies as the fluid is dispensed, the pressure of the fluid provided to the image forming apparatus also varies. Further, typical propellants used in the aerosol supply device may result in the pressure of the fluid being provided therefrom at a higher pressure than desired by the image forming apparatus. Thus, the image forming apparatuses may need to incorporate more costly devices therein to obtain a constant and appropriate level of pressure of the fluid it receives from the aerosol supply device.

FIGS. 1A and 1B are block diagrams of fluid dispensing systems according to embodiments of the present general inventive concept. In one embodiment, as illustrated in FIG. 1A, a fluid dispensing system 100*a* includes an aerosol supply device 10*a* and an external device such as an imaging forming apparatus 18. In this embodiment, the aerosol supply device 10*a* includes a container 14 configured to store fluid, and a pressure regulator apparatus 12 disposed inside the container 14, and configured to regulate a pressure of the fluid to be provided to the image forming apparatus 18. In another embodiment, as illustrated in FIG. 1B, an aerosol supply device 10*b* includes the pressure regulator apparatus 12 disposed outside of and coupled to the container 14. In one embodiment, the image forming apparatus 18 is coupled to the pressure regulator apparatus 12 integrated in the container 14 of the aerosol supply device 10*a* (FIG. 1A). In another embodiment, the image forming apparatus 18 is coupled to the pressure regulator apparatus 12 disposed outside of the container 14 of the aerosol supply device 10*b* (FIG. 1B).

FIG. 2A is a partial perspective view of a pressure regulator apparatus usable with an aerosol supply device in a first inflation state according to an embodiment of the present general inventive concept. FIG. 2B is a partial perspective view of a pressure regulator apparatus in a second inflation state according to an embodiment of the present general inventive concept. Referring to FIGS. 2A and 28, in the present embodiment, a pressure regulator apparatus 12 includes an inflatable diaphragm unit 21 and a biasing unit such as a spring 28 configured to place a predetermined amount of bias pressure, for example, in an upward direction, on the inflatable diaphragm unit 21. The inflatable diaphragm unit 21 includes an upper surface member 21*a*, a lower surface member 21*b*, and a diaphragm chamber 21*c* formed between the upper surface member 21*a* and the lower surface member 21*b*. In the present embodiment, the lower surface member 21*b* moves relative to the upper surface member 21*a* based on an amount of fluid that is in the diaphragm chamber 21*c* and the predetermined amount of pressure applied against it by the spring 28. In one embodiment, the inflatable diaphragm unit 21, for example, is made of a multilayer material to address one or more properties such as ink compatibility, heat staking, air and water barrier, and toughness. For example, the inflatable diaphragm unit 21 may include ink compatible and heat staking materials such as, but not limited to, polyethylene, acetyl, and rubber formulations; high barrier materials to provide a barrier to air and water vapor permeation such as, but not limited to, aluminum foil, ethylene vinyl alcohol, polymers made from vinylidene chloride, polyvinyl chloride and sputtered metals; and toughness material such as, but not limited to, nylon. The inflatable diaphragm unit 21 may also be made from flexible material to allow the lower and upper surface members 21*a* and 21*b* to expand, for example, when the diaphragm chamber 21*c* is under pressure due to the fluid contained therein increasing.

Referring to FIGS. 2A and 2B, the pressure regulator apparatus 12 also includes an output port member 23 having an output cavity 23*a* and an output port 23*b*, a valve actuator 24 including an actuator cavity 24*a* and one or more actuator openings 24*b* (FIG. 3) in fluid communication with the output port 23b, an input port member 25 disposed proximate to the actuator cavity 24a and having an input port 25a configured to allow the fluid to enter the actuator cavity 24a, and an axial flow path 26 extending between the input port 25a and the output port 23b. In the present embodiment, at least a portion of the output port member 23 is disposed within and in fluid communication with the diaphragm chamber 21c, at least a portion of the input port member 25 is disposed in the actuator cavity 24a, and at least a portion of the valve actuator 24 is moveably disposed within the output cavity 23a.

Figure 2A:
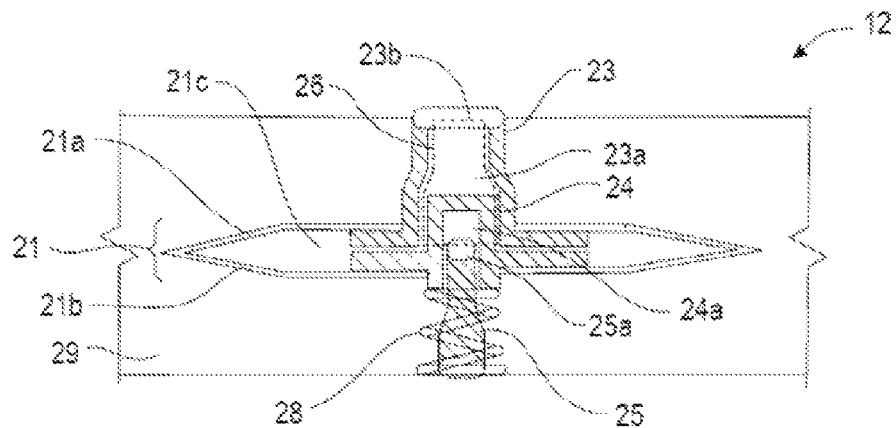
Figure 2B:
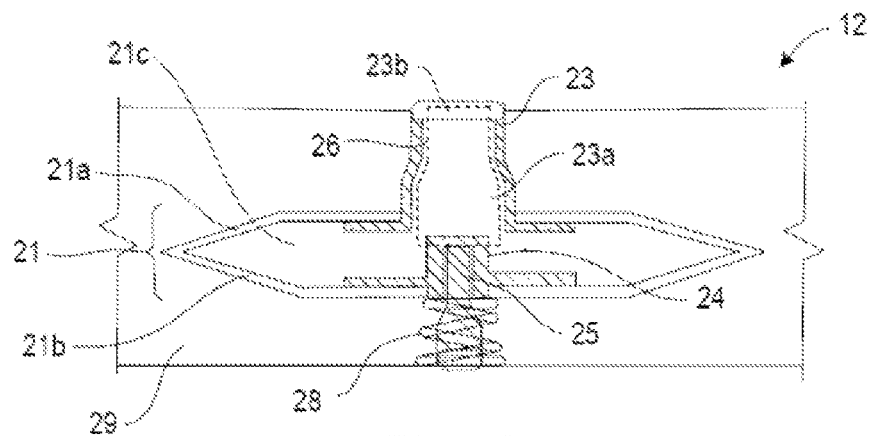

Referring to FIGS. 2A and 2B, in the present embodiment, the pressure regulator apparatus 12 also includes a biasing assembly unit such as a spring 28 to apply a predetermined bias pressure, for example, against the lower surface member 21b of the inflatable diaphragm unit 21 and a housing unit 29. In one embodiment, one end of the spring 28 is in contact with the lower surface member 21b of the inflatable diaphragm unit 21 and an other end of the spring 28 is in contact with the housing unit 29. As illustrated in FIG. 2A, in a first inflation status, the valve actuator 24 is held off of the input port member 25 due to the pressure within the diaphragm chamber 21 not exceeding the predetermined bias pressure applied by the spring 28 to the lower surface member 21b of the inflatable diaphragm unit 21. In the present embodiment, the housing unit 29 surrounds the output port member 23, the valve actuator 24, the input port member 25, the axial flow path 26, and the spring 28.

Referring to FIGS. 2A and 2B, in one embodiment, a portion of the output port member 23 is attached to the upper surface member 21a of the inflatable diaphragm unit 21 and a portion of the valve actuator 24 is attached to the lower surface member 21b of the inflatable diaphragm unit 21. Thus, as an adequate amount of the fluid, for example, from the container 14 of the aerosol supply device 10a and 10b, enters the diaphragm cavity 21c through the input port member 25, the inflatable diaphragm unit 21 inflates such that a portion of the lower surface member 21b and the valve actuator 24 attached thereto move away from the upper surface member 21a. A second inflation state is achieved when the inflated state of the inflatable diaphragm unit 21 exceeds a predetermined inflation level. In the second inflation state, the valve actuator 24 contacts the input port member 25 and closes the input port 25a (FIG. 2B). Thus, no more fluid enters the diaphragm chamber 21c through the input port 25a. In one embodiment, the pressure of the fluid entering the input port member 25 from the aerosol supply device 10a and 10b may be at a relatively high pressure.

Alternatively, in the present embodiment, as an appropriate amount of the fluid leaves the diaphragm chamber 21c, for example, through the output port 23b of the output port member 23, the inflated state of the inflatable diaphragm unit 21 begins to deflate. A first inflation state is achieved when the inflated state of the inflatable diaphragm unit 21 falls below the predetermined inflation level. In the first inflation state, a portion of the lower surface member 21b and the valve actuator 24 attached thereto move toward the upper surface member 21a and the valve actuator 24 separates from the input port member 25 and opens the input port 25a (FIG. 2A). Thus, more fluid enters the diaphragm chamber 21c through the input port 25a, for example, from the container 14 of the aerosol supply device 10a and 10b. In one embodiment, the predetermined inflation level may correspond with the predetermined bias pressure. Thus, the spring 28 and the inflatable diaphragm unit 21 may be selected to achieve a desired amount of pressure of the fluid to be provided to the image forming apparatus 18. For example, a load of the spring 28 and a size of the diaphragm chamber 21c may set the pressure of the fluid provided to the image forming apparatus 18.

Figure 3:
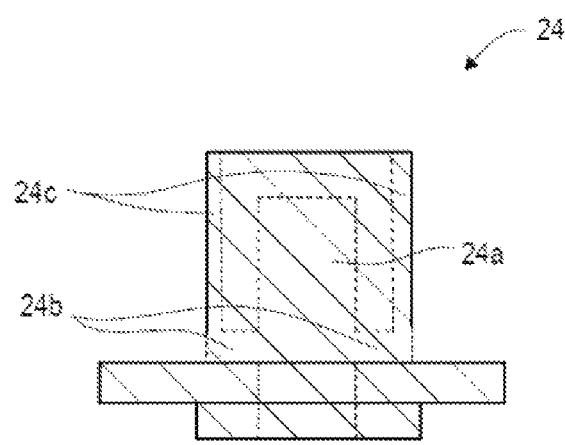

FIG. 3 is a side view illustrating the valve actuator of the pressure regulator apparatus of FIGS. 2A and 2B according to an embodiment of the present general inventive concept. Referring to FIG. 3, in the present embodiment, the valve actuator 24 includes the actuator cavity 24a, and actuator openings 24b configured to allow fluid to pass from the actuator cavity 24a to the diaphragm chamber 21c and/or output cavity 23a. In one embodiment, the valve actuator 24 may also include one or more guide channels 24c to guide the fluid in the output cavity 23a of the output port member 23. In one embodiment, the guide channels 24c may be grooves formed on an outside surface of the valve actuator 24 extending in an axial direction thereof. Referring to FIGS. 2A, 2B and 3, in the present embodiment, the fluid leaves the actuator cavity 24a through the one or more actuator openings 24b into the output cavity 23a and/or diaphragm cavity 21c. The axial flow path 26 is configured to allow the fluid to selectively pass in a substantially axial direction therethrough. That is, the fluid exits the outside port 23b in a path inline with the input port 25a. For example, in one embodiment, the axial flow path 26 includes a direction substantially parallel to a longitudinal axis passing through the input port 25a and the output port 23b.

Figure 1B:
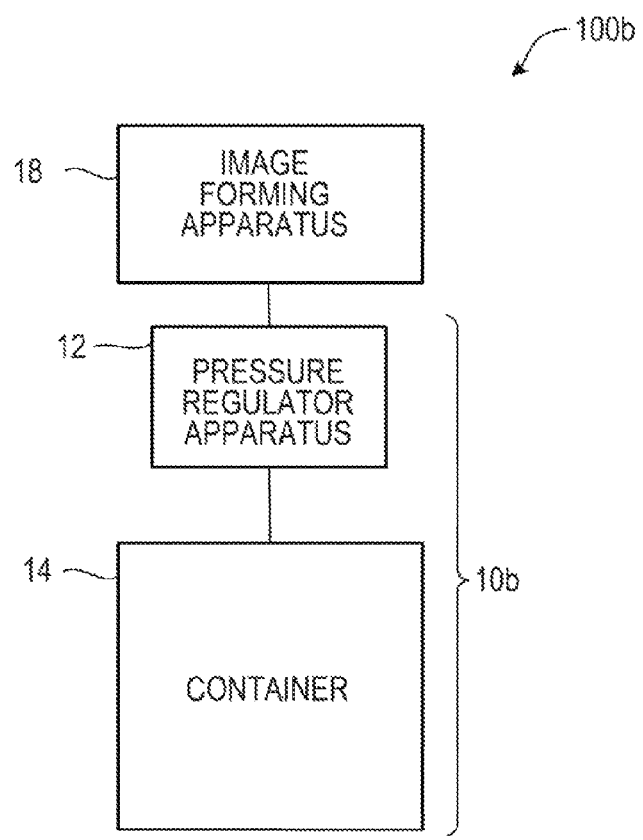

In a supply state, the pressure regulator apparatus 12 regulates a pressure of the fluid to be provided to an external device such as an image forming apparatus 18 at a predetermined and constant pressure. In one embodiment, the regulated pressure of the fluid provided to the image forming apparatus 18 may be in a range of, but not limited to, 1 pound per square inch (psi) to 30 psi, including 3 psi to 10 psi. In the supply state, the fluid enters the actuator cavity 24a through the input port 25a of the input port member 25 from, for example, a container 14 of an aerosol supply device 10a and 10b (FIGS. 1A and 1B). The fluid leaves the actuator cavity 24a through one or more actuator openings 24b into the output cavity 23a. The fluid continues through the output port member 23 and the output port 23b to the image forming apparatus 18. In one embodiment, a size of the input port 25a is relatively small in order to produce a desired flow rate and reduce the effect of container pressure variation on the regulated pressure of the fluid provided to the image forming apparatus 18. In one embodiment, the fluid may be guided through at least a portion of the output cavity 23a by one or more guide channels 24c, for example, in the substantially axial direction. In other embodiments, the guide channels 24c of the valve actuator 24 may be arranged in a tangential manner around the valve actuator 24 and/or at an angle with respect the axial direction such that flow of the fluid passing therethrough is given an element of rotation. This rotation of the fluid assists in scavenging air out of the diaphragm chamber 21c, for example, on initial introduction of the fluid such that the air is passed out the outlet port 23b during a startup routine.

Figure 4:
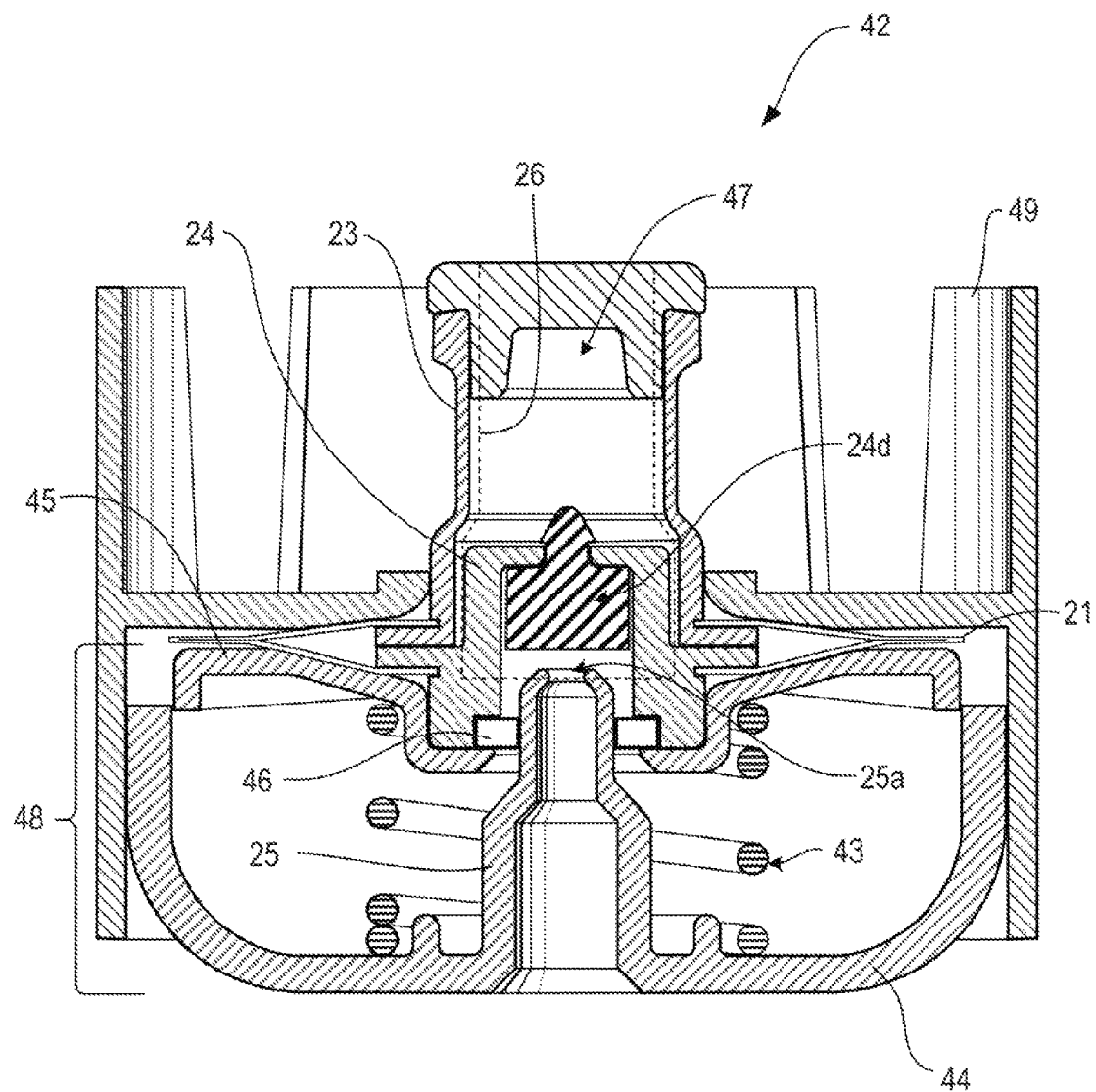

FIG. 4 is a partial perspective view of a pressure regulator apparatus according to an embodiment of the present general inventive concept. Referring to FIG. 4, in the present embodiment, a pressure regulator apparatus 42 may include the output port member 23, the valve actuator 24, the input port member 25, and the axial flow path 26 previously described with reference to the pressure regulator apparatus 12 illustrated in FIGS. 2A and 2B. Referring to FIG. 4, the pressure regulator apparatus 42 also includes a biasing assembly unit 48 in contact with the inflatable diaphragm unit 21, a septum 47 disposed on the output port member 23 and configured to prevent a leak of the fluid upon removal of the pressure regulator apparatus 42 from an external apparatus such as the image forming apparatus 18, a stem seal 46 disposed on the valve actuator 24 and configured to provide a seal between the actuator cavity 24a and the input port member 25, and a valve seat 24d disposed on the valve actuator 24 and configured to move therewith to open and close the input port 25a of the input port member 25.

Referring to FIG. 4, in one embodiment, for example, the septum 47 may have a substantially cylindrical shape in which at least a portion thereof is inserted into the outlet port 23b (FIGS. 2A and 2B) to form a leak proof seal therewith. The septum 47 may also include a flexible portion having a slit which selectively opens and closes in response to its engagement state with, for example, the image forming apparatus 18. The slit may open in response to a portion of the image forming apparatus 18, such as a needle, being inserted therein to selectively establish fluid communication between the pressure regulator apparatus 42 and the image forming apparatus 18. The slit may close in response to the portion of the image forming apparatus 18 being withdrawn therefrom and terminate fluid communication between the pressure regulator apparatus 42 and the image forming apparatus 18. In one embodiment, the stem seal 46, for example, has a circular shape with an outer perimeter surface in contact with the valve actuator 24 and an opening in a center thereof configured to receive the input port member 25 and forming a leak proof seal therewith. In one embodiment, the valve seat 24d may be formed of rubber and comes in contact with the input port member 25 to close the input port 25a when the inflatable diaphragm unit 21 is in the second inflation state as previously described.

Referring to FIG. 4, the biasing assembly unit 48 includes a diaphragm cup 45, a cup member 44, and a spring 43 disposed between the diaphragm cup 45 and the cup member 44. The diaphragm cup 45 may have a side in contact with the lower surface member 21b of the inflatable diaphragm unit 21 and another side in contact with an end of the spring 43. In one embodiment, the diaphragm cup 45 is movable along with the lower surface member 21b of the inflatable diaphragm unit 21. The cup member 44 may include the input port member 25 as previously described with reference to FIGS. 2A and 2B, and be in contact with an other end of the spring 43. In one embodiment, the cup member 44 has an inner surface forming a cup cavity having the input port member 25 extend upwardly therein. In this embodiment, the spring 43 is disposed in the cup cavity with the input port member 25 extending therethrough. The spring 43 is configured to place a predetermined bias pressure, for example, in an upward direction on the lower surface member 21b of the inflatable diaphragm unit 21 through the diaphragm cup 45.

In the present embodiment, the pressure regulator apparatus 42 may also include a cap member 49. In one embodiment, the cap member 49 may surround each of the inflatable diaphragm unit 21, the output port member 23, the valve actuator 24, the axial flow path 26, and the biasing assembly unit 48, and be coupled to a container 14 of an aerosol supply device 10b (FIG. 1B). In another embodiment, the cap member 49 may surround at least a portion of one or more of the inflatable diaphragm unit 21, the output port member 23, the valve actuator 24, the axial flow path 26, and the biasing assembly unit 48, and be coupled to the container 14 of the aerosol supply device 10b (FIG. 1B).

In the present embodiment, at least the septum 47, the outlet port member 23, and the input port member 25 are moveably disposed within the cap member 49 to engage the container 14 to supply the fluid to the pressure regulator apparatus 42. For example, the container 14 may include pressurized fluid and a conventional moveable stem valve coupled to the input port member 25 of the pressure regulator apparatus 42. When an appropriate force is applied to the septum 47, for example, upon connection of the pressure regulator apparatus 42 to the image forming apparatus 18, the septum 47 and the outlet port member 23 move in a manner to cause the input port member 25 to move the stem valve of the container 14 to an open position. Thus, the fluid from the container 14 travels to the input port member 23 of the pressure regulator apparatus 42. When the appropriate force is no longer applied to the septum 47, the stem valve of the container 14 moves to a close position.

In the present embodiment, the inflation status of the inflatable diaphragm unit 21 may include a first inflation state and a second inflation state. In this embodiment, the first inflation state corresponds to a differential pressure in the inflatable diaphragm unit 21 created by a difference in an amount of the fluid entering the input port 25a and leaving the diaphragm chamber 21c not exceeding the predetermined bias pressure. In this embodiment, the second inflation state corresponds to the differential pressure in the inflatable diaphragm unit 21 exceeding the predetermined bias pressure. The valve actuator 24 is configured to close the input port 25a in response to the inflation status being in the second inflation state and the valve actuator 24 is configured to open the input port 25a in response to the inflation status being in the first inflation state.

Referring to FIGS. 1A-2B, in the present embodiment, an aerosol supply device is usable with an image forming apparatus. Referring to FIG. 1B, the aerosol supply device 10a and 10b includes a container 14 configured to store fluid, and a pressure regulator apparatus 12 disposed in fluid communication with the fluid contained in the container 18. The pressure regulator apparatus 12 is configured to regulate a pressure of the fluid to be supplied to the image forming apparatus 18. In the present embodiment, the pressure regulator apparatus 12 includes the inflatable diaphragm unit 21, the output port member 23, the valve actuator 24, the input port member 25, the axial flow path 26, and the biasing assembly unit 48 configured to place the predetermined bias pressure on the inflatable diaphragm unit 21 previously described with reference to FIGS. 2A and 2B. In the present embodiment, the valve actuator 24 moves to close and open the input port 25a based on the inflation status of the inflatable diaphragm unit 21 as previously described to regulate a pressure of the fluid to be provided to the image forming apparatus 18 substantially constant. In one embodiment, the pressure regulator apparatus 12 is disposed inside the container 14 of the aerosol supply device 10a (FIG. 1A). In another embodiment, the pressure regulator apparatus 12 is disposed outside the container 14 of the aerosol supply device 10b (FIG. 1B).

Referring to FIGS. 1A-2B, in the present embodiment, an aerosol supply device 10b usable with an image forming apparatus 18 includes a container 14 configured to store fluid, and a cap member 49 (FIG. 4) coupled to the container 14. In the present embodiment, the cap member 49 is configured to surround a pressure regulator apparatus 12 disposed in fluid communication with the fluid contained in the container 14. Referring to FIG. 1B, the pressure regulator apparatus 12 is configured to regulate a pressure of the fluid to be supplied to the image forming apparatus 18. Referring to FIGS. 2A and 2B, in the present embodiment, the pressure regulator apparatus 12 includes the inflatable diaphragm unit 21, the output port member 23, the valve actuator 24, the input port member 25, the axial flow path 26, and the biasing assembly device such as the spring 28 configured to place the predetermined bias pressure on the inflatable diaphragm unit 21 previously described with reference to FIGS. 2A and 2B. In the present embodiment, the valve actuator 24 of the pressure regulator apparatus 12 surrounded by the cap member 49 (FIG. 4) is configured to close the input port 25a when a differential pressure in the inflatable diaphragm unit 21 created by a difference in an amount of the fluid entering the input port 25a and leaving the diaphragm chamber 21c, for example, through the output port 23a, exceeds the predetermined bias pressure. Further, the valve actuator 24 is configured to open the input port 25a when the differential pressure in the inflatable diaphragm unit 21 does not exceed the predetermined bias pressure. Thus, in this embodiment, the pressure of the fluid provided to the image forming apparatus 18 is substantially constant.

The present general inventive concept has been described using non-limiting detailed descriptions of embodiments thereof that are provided by way of example and are not intended to limit the scope of the general inventive concept. It should be understood that features and/or operations described with respect to one embodiment may be used with other embodiments and that not all embodiments of the general inventive concept have all of the features and/or operations illustrated in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe the best mode contemplated by the inventors and therefore may include structure, acts or details of structures and acts that may not be essential to the general inventive concept and which are described as examples. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A pressure regulator apparatus usable with an aerosol supply device containing a fluid, the pressure regulator apparatus comprising:
   an inflatable diaphragm unit including an upper surface member, a lower surface member, and a diaphragm chamber formed between the upper surface member and the lower surface member;
   an output port member having an output cavity and an output port, at least a portion of the output port member is disposed within and in fluid communication with the diaphragm chamber;
   a valve actuator including an actuator cavity and one or more actuator openings in fluid communication with the output port, at least a portion of the valve actuator is moveably disposed within the output cavity;
   an input port member having an input port configured to allow the fluid to enter the actuator cavity, at least a portion of the input port member is disposed proximate to the actuator cavity; and
   an axial flow path extending between the input port and the output port, and configured to allow the fluid to selectively pass in an axial direction therethrough;
   wherein the valve actuator moves to close and open the input port based on an inflation status of the inflatable diaphragm unit to regulate a pressure of the fluid to be transported from the inflatable diaphragm unit constant.

2. The apparatus according to claim 1, further comprising:
   a biasing assembly unit in contact with the inflatable diaphragm unit, the biasing assembly unit including a diaphragm cup, a cup member, and a spring disposed between the diaphragm cup and the cup member;
   the diaphragm cup having a side in contact with the lower surface member of the inflatable diaphragm unit and another side in contact with an end of the spring;
   the cup member including the input port member, and in contact with another end of the spring; and
   the spring configured to place a predetermined bias pressure in an upward direction on the lower surface member of the inflatable diaphragm unit through the diaphragm cup.

3. The apparatus according to claim 2, wherein the inflation status of the inflatable diaphragm unit comprises:
   a first inflation state corresponding to a differential pressure in the inflatable diaphragm unit created by a difference in an amount of the fluid entering the input port and leaving the diaphragm chamber not exceeding the predetermined bias pressure; and
   a second inflation state corresponding to the differential pressure in the inflatable diaphragm unit exceeding the predetermined bias pressure.

4. The apparatus according to claim 3, wherein the valve actuator is configured to close the input port in response to the inflation status being in the second inflation state and the valve actuator is configured to open the input port in response to the inflation status being in the first inflation state.

5. The apparatus according to claim 2, further comprising:
   a housing unit configured to surround at least one of the inflatable diaphragm unit, the output port member, the valve actuator, the axial flow path, and the biasing assembly unit, wherein the housing unit is disposed inside or outside of a container configured to store the fluid of the aerosol supply device.

6. The apparatus according to claim 5, wherein the housing unit comprises:
   a cap member coupled to the container of the aerosol supply device, and surrounding each of the inflatable diaphragm unit, the output port member, the valve actuator, the axial flow path, and the biasing assembly unit.

7. The apparatus according to claim 2, further comprising:
   a septum disposed on the output port member, and configured to prevent a leak of the fluid upon removal of the pressure regulator apparatus from an external apparatus;
   a stem seal disposed on the valve actuator, and configured to provide a seal between the actuator cavity and the input port member; and
   a valve seat disposed on the valve actuator and configured to move therewith to open and close the input port of the input port member.

8. An aerosol supply device usable with an image forming apparatus, the aerosol supply device comprising:
   a container configured to store fluid; and
   a pressure regulator apparatus disposed in fluid communication with the fluid contained in the container and configured to regulate a pressure of the fluid to be supplied to the image forming apparatus, comprising:
   an inflatable diaphragm unit including an upper surface member, a lower surface member, and a diaphragm chamber formed between the upper surface member and the lower surface member;
   an output port member having an output cavity and an output port, at least a portion of the output port member is disposed within and in fluid communication with the diaphragm chamber;
   a valve actuator including an actuator cavity and one or more actuator openings in fluid communication with the output port, at least a portion of the valve actuator is moveably disposed within the output cavity;

an input port member having an input port configured to allow the fluid from the container to enter the actuator cavity, at least a portion of the input port member is disposed proximate to the actuator cavity; and an axial flow path extending between the input port and the output port, and configured to allow the fluid to selectively pass in an axial direction therethrough;

wherein the valve actuator moves to close and open the input port based on an inflation status of the inflatable diaphragm unit to regulate a pressure of the fluid to be provided to the image forming apparatus constant.

9. The device according to claim 8, further comprising:
a biasing assembly unit in contact with the inflatable diaphragm unit, the biasing assembly unit including a diaphragm cup, a cup member, and a spring disposed between the diaphragm cup and the cup member;

the diaphragm cup having a side in contact with the lower surface member of the inflatable diaphragm unit and another side in contact with an end of the spring;

the cup member including the input port member, and in contact with another end of the spring; and the spring configured to place a predetermined bias pressure in an upward direction on the lower surface member of the inflatable diaphragm unit through the diaphragm cup.

10. The device according to claim 9, wherein the inflation status of the inflatable diaphragm unit comprises:
a first inflation state corresponding to a differential pressure in the inflatable diaphragm unit created by a difference in an amount of the fluid entering the input port and leaving the diaphragm chamber not exceeding the predetermined bias pressure; and a second inflation state corresponding to the differential pressure in the inflatable diaphragm unit exceeding the predetermined bias pressure.

11. The device according to claim 10, wherein the valve actuator is configured to close the input port in response to the inflation status being in the second inflation state and the valve actuator is configured to open the input port in response to the inflation status being in the first inflation state.

12. The device according to claim 11, wherein the pressure regulator apparatus is disposed inside or outside of the container.

13. The device according to claim 12, further comprising:
a cap member coupled to the container, and surrounding the pressure regulator apparatus.

14. An aerosol supply device usable with an image forming apparatus, the aerosol supply device comprising:
a container configured to store fluid;
a cap member coupled to the container, and configured to surround a pressure regulator apparatus disposed in fluid communication with the fluid contained in the container;
the pressure regulator apparatus configured to regulate a pressure of the fluid to be supplied to the image forming apparatus, comprising:
an inflatable diaphragm unit including an upper surface member, a lower surface member, and a diaphragm chamber formed between the upper surface member and the lower surface member;
an output port member having an output cavity and an output port, at least a portion of the output port member is disposed within and in fluid communication with the diaphragm chamber;
a valve actuator including an actuator cavity and one or more actuator openings in fluid communication with the output port, at least a portion of the valve actuator is moveably disposed within the output cavity;
an input port member having an input port configured to allow the fluid from the container to enter the actuator cavity, at least a portion of the input port member is proximate to the actuator cavity; and
an axial flow path extending between the input port and the output port, and configured to allow the fluid to selectively pass in an axial direction therethrough;
wherein the valve actuator is configured to close the input port when a differential pressure in the inflatable diaphragm unit created by a difference in an amount of the fluid entering the input port and leaving the diaphragm chamber exceeds the predetermined bias pressure, and the valve actuator is configured to open the input port when the differential pressure in the inflatable diaphragm unit does not exceed the predetermined bias pressure to regulate a pressure of the fluid to be provided to the image forming apparatus constant.

15. The device according to claim 14, wherein the biasing assembly unit comprises:
a spring configured to place the predetermined bias pressure on the lower surface member of the inflatable diaphragm unit;
a diaphragm cup having a side in contact with the lower surface member of the inflatable diaphragm unit and another side in contact with an end of the spring; and
a cup member including the input port member, and in contact with another end of the spring.

* * * * *